United States Patent Office 2,726,999
Patented Dec. 13, 1955

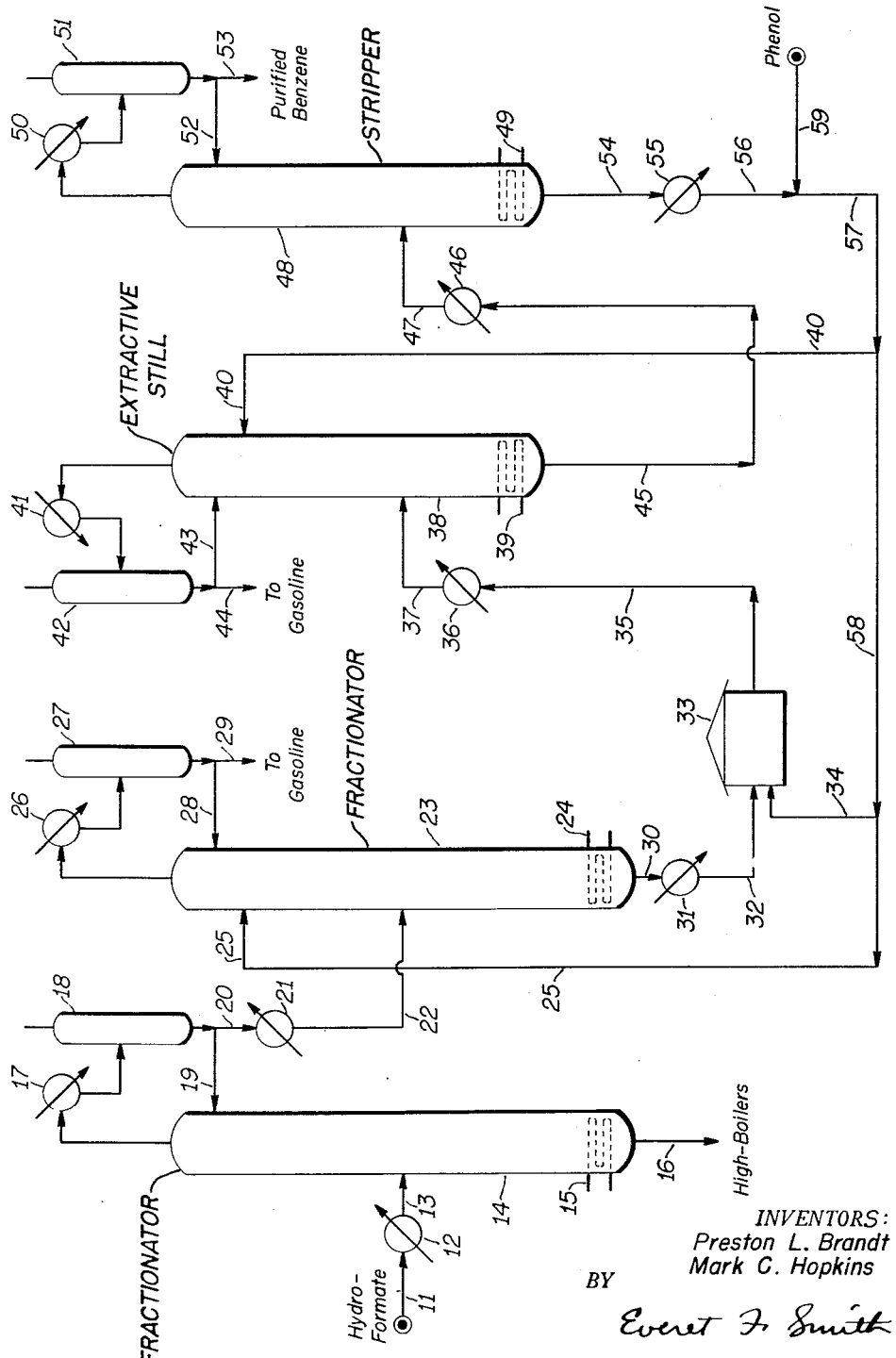

2,726,999

USE OF PHENOL TO PREVENT FOULING DURING EXTRACTIVE DISTILLATION OF BENZENE CONCENTRATES

Preston L. Brandt, La Marque, and Mark C. Hopkins, Texas City, Tex., assignors, by mesne assignments, to The American Oil Company Application November 29, 1951, Serial No. 258,948

4 Claims. (Cl. 202—39.5)

This invention relates to the purification of benzene. More particularly, it relates to the separation of benzene from concentrates thereof by extractive distillation with a phenol. A specific improvement lies in the stabilization of benzene concentrates, whereby fouling of extractive distillation equipment is avoided.

Benzene can be produced in a variety of ways by treatment of naturally occurring hydrocarbon materials. It is most commonly obtained by distillation of drip oils and tars produced in the destructive distillation of coal, the greater part of the world's requirements of benzene being produced in this way. Another source of benzene is the liquid by-products obtained in the high-temperature pyrolysis of hydrocarbon gases, as described for example by Thomas and Hochwalt in U. S. Patent 1,836,629 (December 15, 1931). Another method of benzene production, which is currently undergoing large-scale commercial development, is the hydroforming of cyclohexane-containing stocks, whereby the cyclohexane is dehydrogenated to benzene. In a modification thereof, methylcyclopentane is isomerized to cyclohexane, and the cyclohexane is simultaneously or subsequently dehydrogenated. Most of these methods produce benzene in a more or less impure condition, from which it must be isolated by subsequent treatment. The required purification treatment must be conducted under carefully controlled conditions, owing to the fact that the impurities are so similar to benzene in physical and chemical properties that the desired separation cannot be easily effected. The most commonly and successfully employed purification method is extractive distillation of a narrow-boiling concentrate in the presence of a suitable solvent for benzene. A highly successful process for the recovery of pure benzene and other aromatics, ultilizing extractive distillation, is described by Dunn and McConaughy in Reissue 22,379 (September 28, 1943).

In carrying out the extractive distillation of benzene in the presence of a phenol, we have encountered severe plugging and fouling of the extractive distillation tower and associated equipment through deposition of gums, tars, precipitates, and the like therein. Such fouling, we have observed, occurs only during the extractive distillation of benzene concentrates which have been exposed for some time to contact with air. We have now discovered that the incorporation of a small percentage, between about 0.1 and 5 percent by weight, preferably 0.1 to 2.5 percent, optimally about 1 percent, of a phenol in the benzene concentrate during exposure thereof to air is capable of completely preventing any such plugging and fouling. We believe it to be quite striking that phenol, which is completely without effect in preventing fouling when used in the extractive distillation zone itself, is highly effective in preventing degradation of the concentrate when incorporated therein prior to the extractive distillation step.

One object of our invention is to purify benzene. Another object is to isolate benzene from close-boiling impurities. A further object is to prevent deposition of solids within the extractive-distillation zone during the extractive distillation of benzene. A still further object is to prevent tar formation in stills employed for the extractive distillation of benzene. A special object is to prevent deterioration of benzene concentrates during storage in contact with air. A subsidiary object is to improve the separation of a benzene-boiling-range concentrate from a stock of wider boiling range. Other objects of our invention will be apparent from the appended description and claims.

Our invention will be more fully understood from the following specific example thereof, to be read in conjunction with the accompanying flowsheet.

A benzene-containing stream such as a cyclohexane hydroformate, supplied through line 11, flows through heater 12, where it is partially vaporized, and line 13 into an intermediate section of fractionating column 14, equipped with reboiler 15. Components of the charging stock boiling above about 85° C. are withdrawn from the bottom of the column through line 16. The remainder of the charging stock, containing substantially all of the benzene, is distilled overhead through condenser 17 and reflux drum 18, from which a portion is refluxed through line 19 to column 14, and the remainder is withdrawn through line 20.

The distillate fraction in line 20 is led through heater 21, where a substantial proportion is vaporized, and line 22 into an intermediate section of fractionating column 23, equipped with reboiler 24. A small stream of liquid phenol is introduced through line 25 into an upper section of column 23, and is allowed to flow downward through the column. The phenol functions as a preferential solvent to assist in knocking back benzene from the ascending vapors, and further functions as a stabilizing agent in the liquid stream emerging from the bottom of the column. For the latter purpose, the proportion of phenol introduced into the column should preferably be between about 0.1 and 5 percent by weight of the bottom stream. A vapor stream substantially free from benzene emerges overhead from column 23 and is condensed in cooler 26. The condensate flows into reflux drum 27, from which a portion is refluxed through line 28 to column 23, and the remainder is withdrawn through line 29 for use as a blending stock in gasolines. From the bottom of column 23 a benzene concentrate boiling between about 65 and 85° C. emerges through line 30 and flows through cooler 31 and line 32 into storage tank 33, wherein it is held in contact with air. The bottom fraction also contains the phenol which was introduced through line 25. Additional phenol may be added to storage tank 33 through line 34 if desired.

We prefer to avoid the entry of water into the inhibited concentrate storage tank, since it will be obvious that a water phase in contact with the inhibited concentrate will effect the removal of a quantity of the phenol therefrom. When water is permitted within the tank, the total quantity of phenol therein should be adjusted so that the desired concentration of phenol in the benzene concentrate is arrived at and maintained. The required total quantity of phenol under these circumstances can readily be calculated from distribution coefficients reported in the prior art. Means should also be provided for withdrawing the water phase as required, and for recovering phenol therefrom.

The benzene concentrate in storage tank 33 is led through line 35, heater 36, and line 37 into an intermediate section of extractive distillation column 38, equipped with reboiler 39. Therein, the concentrate passes upward as a vapor stream countercurrent to a stream of liquid phenol, introduced through line 40 into an upper section of column 38. The phenol is ordinarily employed in a volume ratio to the charging stock between about 0.2:1 and 4:1, or a volume ratio to the benzene in the charging stock between about 1:1 and 10:1, whichever requires the larger volume of phenol. The extractive distillation is preferably carried out at ordinary pressures and at the temperatures required to maintain the required countercurrent flow of liquid and vapor. As the phenol flows downward through the column, it selectively dissolves the benzene from the rising stream of vapors, while allowing the nonaromatic materials to pass upward and out of the top of the column through cooler 41 and reflux drum 42. A quantity of the distillate stream is refluxed through line 43 to the top of column 38 in order to prevent any loss of phenol vapors therefrom, while the remainder is withdrawn through line 44 and is used as a blending stock in gasolines.

From the bottom of column 38 emerges a solution of substantially pure benzene in phenol. This stream is conveyed through line 45, heater 46, and line 47 into an intermediate section of stripping column 48. Within the column, the benzene is striped substantially completely from the phenol by the action of reboiler 49. The benzene emerges overhead through cooler 50 to reflux drum 51, from which a portion is refluxed through line 52 to the top of column 48, while the remainder is withdrawn through line 53 to storage. A lean phenol stream, substantially free from benzene, flows out of the bottom of column 48 through line 54, cooler 55, and line 56, and is recycled through line 57 as desired to extractive distillation column 38 through line 40, to storage tank 33 through lines 58 and 34, and/or to fractionating column 23 through lines 58 and 25. Makeup phenol is added as required through line 59 to line 57.

A hydroformed benzene concentrate which had been exposed to air in tank 33 for 16 days was extractively distilled with phenol, as described above in connection with extractive distillation column 38. Severe pluggage and fouling of the column and associated equipment was observed at the end of 42 days of operation. A series of tests were then carried out to study the effect of air exposure on the concentrate. Samples of the concentrate were prepared containing 0, 1, 2.5, and 5 percent by weight of phenol. Each of the samples was placed in a glass-lined oxidation bomb, the bombs were filled with oxygen to a pressure of 100 pounds per square inch gage, and the samples were allowed to oxidize for two hours at room temperature without agitation. At the end of this time, the peroxide number of each sample was determined by the method of Wagner et al. (Analytical Chemistry, 19 (1947), pages 976–9) as a measure of the oxidation that had occurred. The results were as follows:

| Phenol Concentration, wt. percent | Peroxide Number, mg./l. active O |
|---|---|
| 0 | 160 |
| 1 | 2.2 |
| 2.5 | 3.1 |
| 5 | 8.9 |

These data demonstrate that benzene concentrates undergo severe oxidation under the test conditions in the absence of an inhibitor. In the presence of phenol, however, the oxidation is reduced to a negligible amount. The results further indicate that a phenol concentration of about 1 percent by weight is the optimum from the point of view of achieving a maximum effect per unit of inhibitor.

Ring-hydroxylated benzenes as a class are suitable for use as the inhibitor in our improved process, including phenol, cresols, xylenols, resorcinols, and the like. We prefer to employ a phenol that is liquid under the processing conditions, and we further prefer to employ the same phenol as the inhibitor and as the extractive distillation solvent. For both of these purposes, we have found phenol itself to be most satisfactory. The use of the same phenol for both purposes permits the recovery of the inhibitor from the concentrate by means of the extractive distillation system, and avoids any subsequent difficulty which would arise from admixing different materials.

While we have illustrated our invention with a specific example thereof, it is to be understood that we are not restricted to the charging stock, manipulative steps, operating conditions, or process materials described therein, but may practice our invention broadly within the scope of the present specification and claims. In general it is to be understood that any modifications or equivalents that would ordinarily occur to one skilled in the art are to be considered as lying within the scope of our invention.

In accordance with the foregoing description, we claim as our invention:

1. In a method for separating benzene from a narrow-boiling benzene concentrate by extractive distillation of the said concentrate after exposure thereof to air, the improvement which comprises incorporating between about 0.1 and 5 per cent by weight of a ring-hydroxylated benzene in said concentrate prior to said exposure to air and maintaining said ring-hydroxylated benzene therein during such exposure to air prior to said extractive distillation, whereby fouling of the distillation zone during said extractive distillation is avoided.

2. In a method for separating benzene from a narrow-boiling benzene concentrate by extractive distillation of the said concentrate after exposure thereof to air, the improvement which comprises incorporating between about 0.1 and 2.5 per cent by weight of phenol in said concentrate prior to said exposure to air and maintaining said phenol therein during such exposure to air prior to said extractive distillation, whereby fouling of the distillation zone during said extractive distillation is avoided.

3. In a process for the separation of benzene from a benzene-containing mixture by fractionally distilling said mixture and separating therefrom a benzene-boiling-range concentrate as a bottom fraction, storing said concentrate in contact with air, thereafter extractively distilling said concentrate in the presence of a phenol, whereby a phenolic solution of purified benzene is obtained, and stripping said purified benzene from said phenolic solution, the improvement which comprises effecting said fractional distillation wherein said bottom fraction is separated from said benzene-containing mixture by fractionally distilling said benzene-containing mixture countercurrent to a stream of a liquid phenol in a proportion between about 0.1 and 5 percent by weight based on said bottom fraction, whereby the segregation of benzene into said bottom fraction is facilitated and said phenol is incorporated therein, and maintaining said phenol therein during contact of said bottom fraction with air prior to said extractive distillation, whereby fouling of the extractive-distillation zone during the said extractive distillation is avoided.

4. In a process for the separation of benzene from a benzene-containing hydroformate by fractionally distilling said hydroformate and separating therefrom a benzene-boiling-range concentrate as a bottom fraction, storing said concentrate in contact with air, thereafter extractively distilling said concentrate in the presence of phenol, whereby a phenolic solution of purified benzene is obtained, and stripping said purified benzene from said phenolic solution, the improvement which comprises effecting said fractional distillation wherein said bottom fraction is separated from said benzene-containing mixture by fractionally distilling said benzene-containing mixture countercurrent to a stream of liquid phenol in a proportion between about 0.1 and 5 per cent by weight based on said bottom fraction, whereby the segregation of benzene into said bottom fraction is facilitated and said phenol is incorporated therein, and maintaining said phenol therein during contact of said bottom fraction with air prior to said extractive distillation, whereby fouling of the extractive-distillation zone during the said extractive distillation is avoided.

References Cited in the file of this patent
UNITED STATES PATENTS

| | | |
|---|---|---|
| 2,151,374 | Cooke | Mar. 21, 1939 |
| 2,375,036 | Pierotti et al. | May 1, 1945 |
| 2,425,842 | Seyfried et al. | Aug. 19, 1947 |
| 2,460,852 | Shiras et al. | Feb. 8, 1949 |